United States Patent
Hsiao et al.

(10) Patent No.: US 7,853,763 B2
(45) Date of Patent: Dec. 14, 2010

(54) STORAGE APPARATUS AND METHOD FOR ACCESSING A STORAGE APPARATUS

(75) Inventors: Wei-Yi Hsiao, Chupei (TW); Chun-Kun Lee, Chupei (TW); Chien-Kuan Lee, Chupei (TW)

(73) Assignee: Silicon Motion, Inc., Jhubei (TW)

( * ) Notice: Subject to any disclaimer, the term of this patent is extended or adjusted under 35 U.S.C. 154(b) by 608 days.

(21) Appl. No.: 11/947,913

(22) Filed: Nov. 30, 2007

(65) Prior Publication Data

US 2008/0177927 A1   Jul. 24, 2008

(30) Foreign Application Priority Data

Jan. 23, 2007   (TW) ............... 96102511 A (51) Int. Cl.
*G06F 12/00* (2006.01)
(52) U.S. Cl. ............ 711/159; 711/103; 711/156; 365/185.33
(58) Field of Classification Search ........... 711/159, 711/156, 103; 365/185.33
See application file for complete search history.

(56) References Cited

U.S. PATENT DOCUMENTS

| | | | |
|---|---|---|---|
| 6,260,156 B1 * | 7/2001 | Garvin et al. | 714/8 |
| 6,587,915 B1 * | 7/2003 | Kim | 711/103 |
| 6,742,078 B1 * | 5/2004 | Chien et al. | 711/103 |
| 2004/0049627 A1 * | 3/2004 | Piau et al. | 711/103 |
| 2007/0186033 A1 | 8/2007 | Shinagawa et al. | |

FOREIGN PATENT DOCUMENTS

CN   1591685   3/2005

* cited by examiner

*Primary Examiner*—Stephen C Elmore
(74) *Attorney, Agent, or Firm*—Grossman, Tucker, Perreault & Pfleger, PLLC (57) ABSTRACT

A storage apparatus and an accessing method for the storage apparatus are provided. The storage apparatus comprises a plurality of data blocks, a plurality of spare blocks, and a calculation apparatus. The calculation apparatus is configured to (1) confirm whether a written block has to be updated, (2) select one of the spare blocks as the first moving block, (3) select one of the data blocks as second moving block, (4) store the first data of the second moving block into the first moving block, and (5) store the second data related to the written block into the second moving block. By updating a written block, data stored in other blocks are moved between each other. Blocks are charged and discharged so that data in the blocks are more accurate. The lifetime of the storage apparatus can be increased as well.

18 Claims, 12 Drawing Sheets

| LB2 | LB8 | BB0 | LB3 | LB4 |
| LB5 | LB6 | LB7 | BB1 | LB9 |
| | | ... ... | | |
| LB995 | LB996 | LB997 | LB998 | LB999 |
| LB0 | LB1 | BB2 | BB3 | BB4 |
| | | ... ... | | |
| BB19 | BB20 | BB21 | BB22 | BB23 |

| LB0  | LB5  | LB10 | LB15 | LB20 |
|------|------|------|------|------|
| LB25 | LB30 | LB35 | LB40 | LB45 |

... ...

| BB0  | BB5  | BB10 | BB15 | BB20 |

... ...

| LB1 | LB6 | LB11 | LB16 | LB21 |

... ...

| BB1 | BB6 | BB11 | BB16 | BB21 |

... ...

⋮

| LB4 | LB9 | LB14 | LB19 | LB24 |

... ...

| BB4 | BB9 | BB14 | BB19 | BB24 |

| LB0  | LB5  | LB10 | LB15 | LB20 |
|------|------|------|------|------|
| LB25 | LB30 | LB35 | LB40 | LB45 |
|      |      | ... ... |   |      |
| BB0  | BB5  | BB10 | BB15 | BB20 |
|      |      | ... ... |   |      |

| LB1 | LB6 | LB11 | LB16 | LB21 |
|-----|-----|------|------|------|
|     |     | ... ... |   |      |
| BB1 | BB6 | BB11 | BB16 | BB21 |
|     |     | ... ... |   |      |

⋮

| BB4 | LB4  | LB14 | LB19 | LB24 |
|-----|------|------|------|------|
|     |      | ... ... |  |      |
| LB9 | BB9  | BB14 | BB19 | BB24 |
|     |      | ... ... |  |      |

| LB0  | LB5  | LB10 | LB15 | LB20 |
|------|------|------|------|------|
| LB25 | LB30 | LB35 | LB40 | LB45 |

... ...

| BB0 | BB5 | BB10 | BB15 | BB20 |
|-----|-----|------|------|------|

... ...

| LB1 | LB6 | LB11 | LB16 | LB21 |
|-----|-----|------|------|------|

... ...

| BB1 | BB6 | BB11 | BB16 | BB21 |
|-----|-----|------|------|------|

... ...

⋮

| LB4 | LB9 | LB14 | LB19 | LB24 |
|-----|-----|------|------|------|

... ...

| BB4 | BB9 | BB14 | BB19 | BB24 |
|-----|-----|------|------|------|

| LB0 | LB5 | BB1 | LB15 | LB20 |
| LB25 | LB30 | LB35 | LB40 | LB45 |
| ... ... | | | | |
| BB0 | BB5 | BB10 | BB15 | BB20 |
| ... ... | | | | |

| LB10 | LB6 | LB11 | LB16 | LB21 |
| ... ... | | | | |
| LB1 | BB6 | BB11 | BB16 | BB21 |
| ... ... | | | | |

⋮

| LB4 | LB9 | LB14 | LB19 | LB24 |
| ... ... | | | | |
| BB4 | BB9 | BB14 | BB19 | BB24 |
| ... ... | | | | |

STORAGE APPARATUS AND METHOD FOR ACCESSING A STORAGE APPARATUS

This application claims priority to Taiwan Patent Application No. 096102511 filed on Jan. 23, 2007. The disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a storage apparatus and an accessing method thereof; specifically, it relates to a storage apparatus whose storage blocks can be uniformly used and an accessing method thereof.

2. Descriptions of the Related Art

Due to rapid technological developments, many companies have manufactured various portable storage apparatuses using different materials and techniques. For example, these materials could be different forms of flash memories, such as NOR flash memories, NAND flash memories, NROM flash memories, and SLC/MLC flash memories.

Flash memories that are currently on the market typically use one or several blocks as the accessing unit. When data has been stored in the flash memory, the data are expected to be stored forever. However, flash memories currently on the market have some limitations on their circuit structures, which damage the accuracy of the stored data. That is, if the data is stored in the flash memory and has not been updated for a long time, the accuracy of the data will be damaged by the coupling effect of the reading and/or writing of other blocks.

In addition, current memory management and memory access methods have some drawbacks as well. Since all blocks are managed in the same way, the same physical blocks of the flash memory are accessed repeatedly if the user often uses only part of the flash memory. As a result, the frequently used blocks will not be able to be written on and can only be read from. As for the other blocks, although they are supposed to be able to be written on, they can only be read from. As a result, the usage of the flash memory is seriously decreased.

Therefore, due to the concerns raised from the aforementioned descriptions, it is important to find a way to maintain the accuracy of the stored data in the flash memory, as well as finding a way to uniformly use the blocks in the flash memory so that no blocks are left unused.

SUMMARY OF THE INVENTION

An objective of the present invention is to provide a storage apparatus. The storage apparatus comprises a plurality of data blocks, a plurality of spare blocks, and a calculation apparatus. The calculation apparatus is configured to confirm that a first written block needs updating, select one of the spare blocks as a first moving block, select one of the data blocks as a second moving block, write a first data of the second moving block into the first moving block, and write a second data related to the first written block into the second moving block, wherein the second moving block is not the first written block.

Another objective of the present invention is to provide a method for accessing a storage apparatus. The storage apparatus comprises a plurality of data blocks and a plurality of spare blocks. The method comprises the steps of confirming that a first written block needs updating; selecting one of the spare blocks as a first moving block; selecting one of the data blocks as a second moving block, the second moving block not being the first written block; writing a first data of the second moving block into the first moving block; and writing a second data related to the first written block into the second moving block.

The storage apparatus of the present invention is grouped into a plurality of management units. The accessing method of the present invention operates with the storage apparatus of the present invention. When a block of the storage apparatus needs updating, the present invention uses this opportunity to move data from other blocks. The blocks with data to be moved are charged and discharged to maintain the accuracy of the data. In addition, the present invention rotates the usage of blocks in different management units so that blocks comprised in the storage apparatus can be uniformly used. As a result, the lifetime of the storage apparatus is prolonged.

The detailed technology and preferred embodiments implemented for the subject invention are described in the following paragraphs accompanying the appended drawings for people skilled in the art to well appreciate the features of the claimed invention.

DESCRIPTION OF THE PREFERRED EMBODIMENT

FIG. 1 illustrates a first embodiment of the present invention, which is a storage apparatus 1. The storage apparatus 1 comprises a plurality of data blocks PB0~PB999, a plurality of spare blocks PB1000~PB1023, a calculation apparatus 11, and a memory 12. The memory 12 stores a plurality of logical pointers LB0~LB999 corresponding to the data blocks PB0~PB999 and a plurality of backup pointers BB0~BB23 corresponding to the spare blocks PB1000~PB1023. The backup pointers BB0~BB23 have a first sequence; that is, they are sorted by their serial numbers. The logical pointers LB0~LB999 have a second sequence; that is, they are also sorted by their serial numbers as well.

Figure 1A:
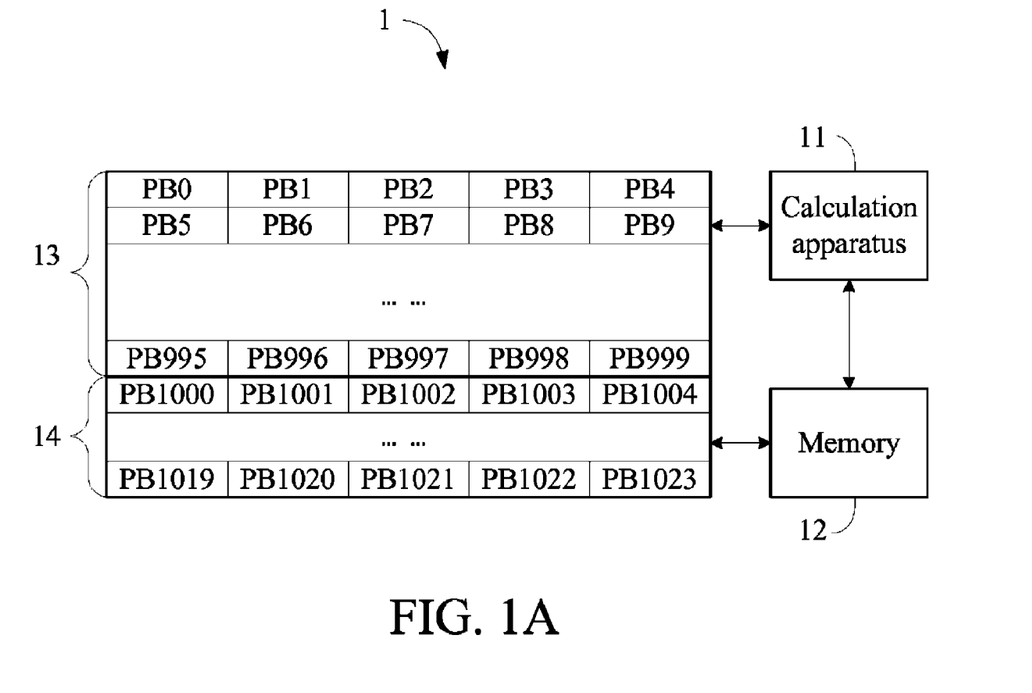
FIG. 1A illustrates a storage apparatus of a first embodiment.

The storage apparatus 1 is set to an initial state so that the logical pointers LB0~LB999 correspond to the data blocks PB0~PB999 according to their serial numbers. For example, logical pointer LB0 corresponds to data block PB0, logical pointer LB1 corresponds to data block PB1, logical pointer LB999 corresponds to data block PB999, etc. Similarly, the backup pointers BB0~BB23 correspond to the spare blocks PB1000~PB1023 according to their serial numbers as well. For example, backup pointer BB0 corresponds to spare block PB1000, backup pointer BB23 corresponds to spare block PB1023, etc. In the first embodiment, a data area 13 comprises the data blocks PB0~PB999 which correspond to by the logical pointers LB0~LB999. A spare area 14 comprises the spare blocks PB1000~PB1023 which correspond to by the backup pointers BB0~BB23.

Based on the memory management method of the present invention, some of the logical pointers LB0~LB999 in the first embodiment will correspond to different data blocks after every access. The logical pointers LB0~LB999 are pointers that manage the data blocks. For example, the logical pointers LB0~LB999 are able to show a relation between data on different data blocks and indicate which blocks need to be accessed when a user intends to retrieve some data. Similarly, based on the memory management method of the present invention, some of the backup pointers BB0~BB23 will correspond to different spare blocks after every access as well. Since the blocks corresponded to by the pointers vary from time to time, the data blocks comprised in the data area and the spare blocks comprised in the spare area change accordingly as well. The concrete memory management method of the embodiment will be detailed later.

Figure 1B:
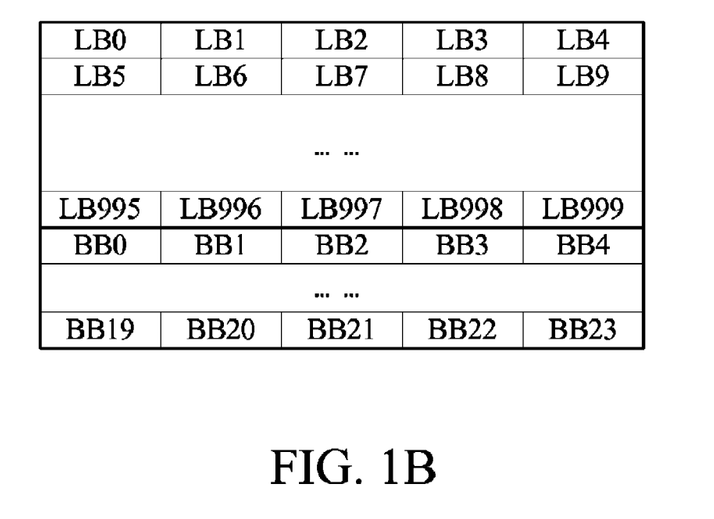
FIG. 1B illustrates the initial relationships between the logical pointers and the data blocks and between the backup pointers and the spare blocks of the first embodiment.

FIG. 1B illustrates the initial relationships between the logical pointers LB0~LB999 and the data blocks PB0~PB999 and between the backup pointers BB0~BB23 and the spare blocks PB1000~PB1023. FIG. 1A and FIG. 1B illustrate the logical pointers LB0~LB999 and the backup pointers BB0~BB23 in the positions in accordance with their corresponding blocks PB0~PB1023. For example, logical pointer LB0 in FIG. 1B corresponds to data block PB0 in FIG. 1A, while backup pointer BB23 in FIG. 1B corresponds to spare block PB1023 in FIG. 1B. It is noted that FIG. 1B is just a schematic diagram illustrating the corresponding relationships for better understanding. The arrangement of the pointers in FIG. 1B are not the real arrangements of the pointers in the memory 12. In other words, the real arrangements of the pointers are not used to limit the scope of the present invention.

The memory management method is explained in the following example in accordance with FIG. 1C. Assume that a user intends to update the data block corresponding to the logical pointer LB2, for example, a host requesting to update data block is received from a host or new data to be stored in the data block is received from a host. The calculation apparatus 11 first confirms that the data block corresponding to logical pointer LB2 is data block PB2. The data block PB2 is the denoted as a first written block PB2, indicating that it requires update. Next, the calculation apparatus 11 selects one of the spare blocks PB1000~PB1023 as a first moving block according to a first sequence of the backup pointers BB0~BB23 and selects one of the data blocks PB0~PB999, besides the first written block PB2, as a second moving block according to a second sequence of the logical pointers LB0~LB999. More precisely, the first sequence is the order from backup pointer BB0 to backup pointer BB23. Thus, the calculation apparatus 11 selects spare block PB1000 corresponding to the backup pointer BB0 as the first moving block PB1000. Similarly, the second sequence is the order from logical pointer LB0 to logical pointer LB999. Consequently, the calculation apparatus 11 selects data block PB0 corresponding to logical block LB0 as the second moving block PB0.

Figure 1C:
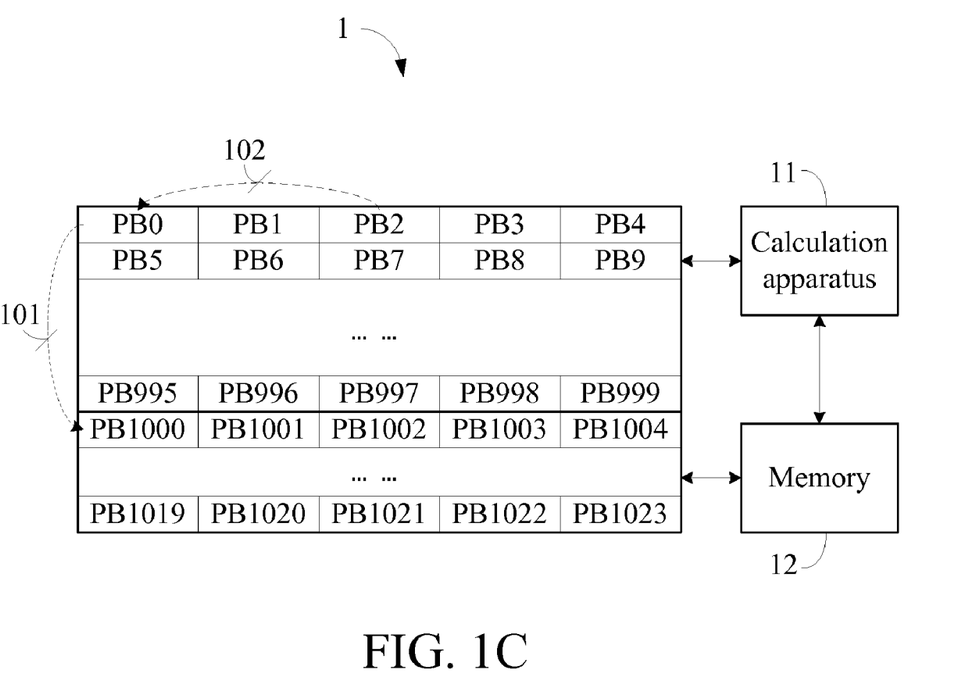
FIG. 1C illustrates the concept of data moving.
Figure 1D:
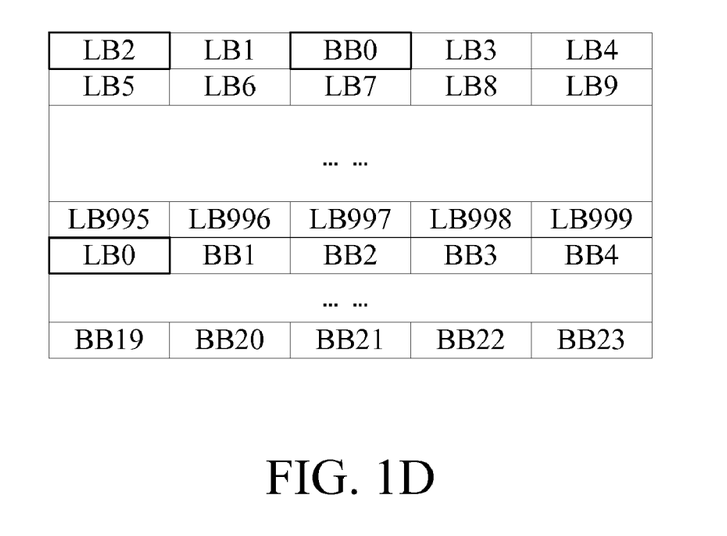
FIG. 1D illustrates the relationships between the pointers and the blocks after the LB2 has been processed.

Meanwhile, the calculation apparatus 11 erases a content of the first moving block PB1000 and then writes a first data originally stored in the second moving block PB0 into the first moving block PB1000 as indicated by arrow 101 in FIG. 1C. Logical pointer LB0, which originally corresponded to PB0, needs to be changed to correspond to PB1000 to ensure that the logical pointer LB0 still corresponds to the first data, thereby, maintaining the accuracy of the data. This shows that the logical pointers LB0~LB999 will correspond to different data blocks after every access. Now, PB0 becomes available because its content had been moved elsewhere, i.e. the first moving block PB1000. Then, the calculation apparatus 11 erases a content of the second moving block PB0 and writes a second data originally stored in the first written block PB2 into the second moving block PB0 as indicated by the arrow 102 in FIG. 1C. Similarly, the logical pointer LB2 that originally corresponded to PB2 has to be changed to correspond to PB0 to ensure the accuracy of the data access. Moreover, the backup pointer BB0 has to be changed to correspond to PB2. Now, the update of the first written block PB2 of the storage apparatus 1 has been completed. The relationships between the pointers and the blocks after the update are illustrated in FIG. 1C. It is noted that the memory management method of the storage apparatus 1 can be set to not erase the content of the first moving block PB1000 and the content of the second moving block PB0 before reading and/or writing the first data and the second data.

Figure 1E:
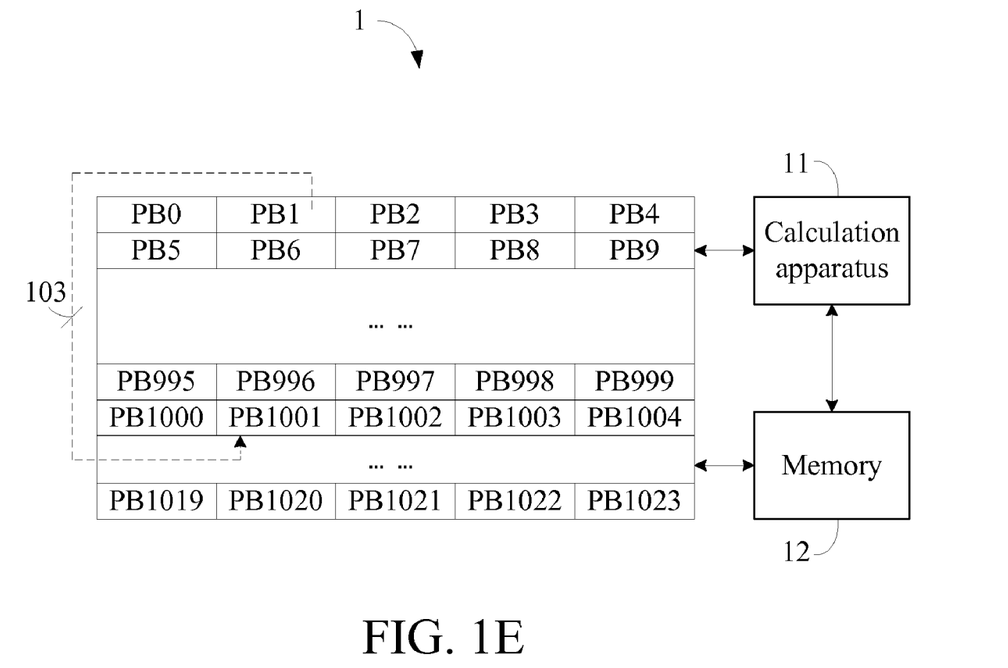
FIG. 1E illustrates another concept of data moving.
Figure 1F:
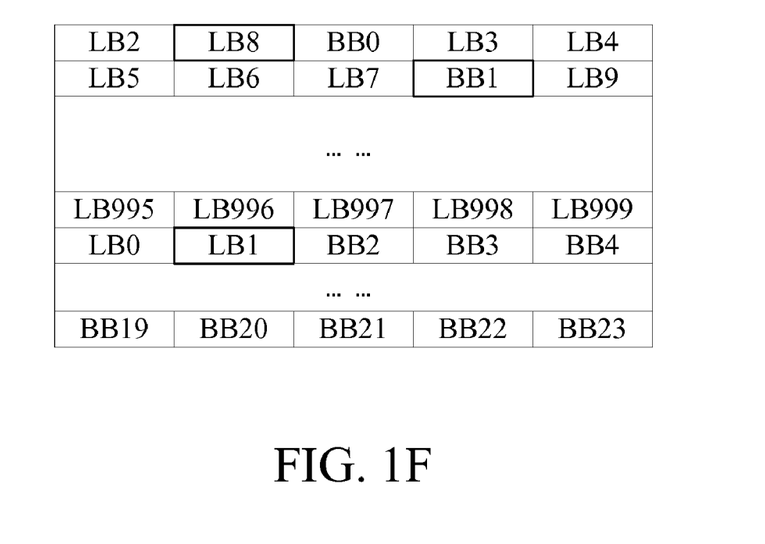
FIG. 1F illustrates the relationships between the pointers and the blocks after the LB8 has been processed.

Referring to FIG. 1E with the following descriptions, where the user intends to store a fourth data, which could be new data received form a host (not shown) into the data block corresponding to the logical pointer LB8 in the storage apparatus 1. The calculation apparatus 11 confirms that the data block corresponding to the logical pointer LB8 is data block PB8. This means that data block PB8 is denoted as the second written block PB8, i.e. the one required for an update. Next, the calculation apparatus 11 selects one of the spare blocks as the third moving block according to the first sequence. Since the spare block corresponding to the backup pointer BB0 was selected previously, the calculation apparatus 11 selects the spare block corresponding to the next backup pointer BB1, i.e. PB1001, as the third moving block PB1001. The calculation apparatus 11 selects one of the data blocks as a fourth moving block according to the second sequence. Similarly, since the data block corresponding to the logical pointer LB0 was previously selected, the calculation apparatus 11 selects the data block PB1 corresponding to the next logical pointer LB1 as the fourth moving block PB1.

Next, the calculation apparatus 11 erases a content of the third moving block PB1001 and then writes a third data originally stored in the fourth moving block PB1 into the third moving block PB1001 as shown by the arrow 103 in FIG. 1E. The logical pointer LB1 originally corresponding to PB1 has to be changed to correspond to PB1001 to ensure the accuracy of the data access. Then, PB1 becomes the available data block because its content has been moved to the third moving block PB1001. The calculation apparatus 11 erases a content of the fourth moving block PB1 and then writes a fourth data related to the second written block PB8 into the fourth moving block PB1. The fourth data of the embodiment is an external data that the user intends to store, but not the data originally stored in the second written block PB8. Thus, the calculation apparatus 11 is able to directly write the fourth data into the fourth moving block PB1. The calculation apparatus 11 does not have to write the data originally stored in the second written block PB8 into the fourth moving block PB1 as the previous example.

Next, logical pointer LB8, originally corresponding to data block PB8, has to be changed to correspond to data block PB1 to ensure the accuracy of data access. Meanwhile, backup pointer BB1, originally corresponding to the spare block PB1001, has to be changed to correspond to PB8 as well. The writing of the fourth data is now completed.

Based on the aforementioned arrangements, when the first embodiment intends to write in or update the data block corresponding to a logical pointer, the calculation apparatus 11 first selects a selected data block from the current data area and a selected spare block from the current spare area. Next, a content of the selected data block is written into the selected spare block and then the data related to the written block is written into the selected data block. That is, the content of the selected data block is moved to the selected spare block and then the data intended to be written in is written into the selected data block. Since the content of every block will be erased by charging and/or discharging prior to the writing in of the data, data stored in the block is updated and data accuracy is ensured. Compared to the prior art, the first embodiment involves more blocks each time a data block needs update or writing. In other words, more blocks will be charged and be discharged. As a result, the blocks ensure data accuracy.

Figure 2A:
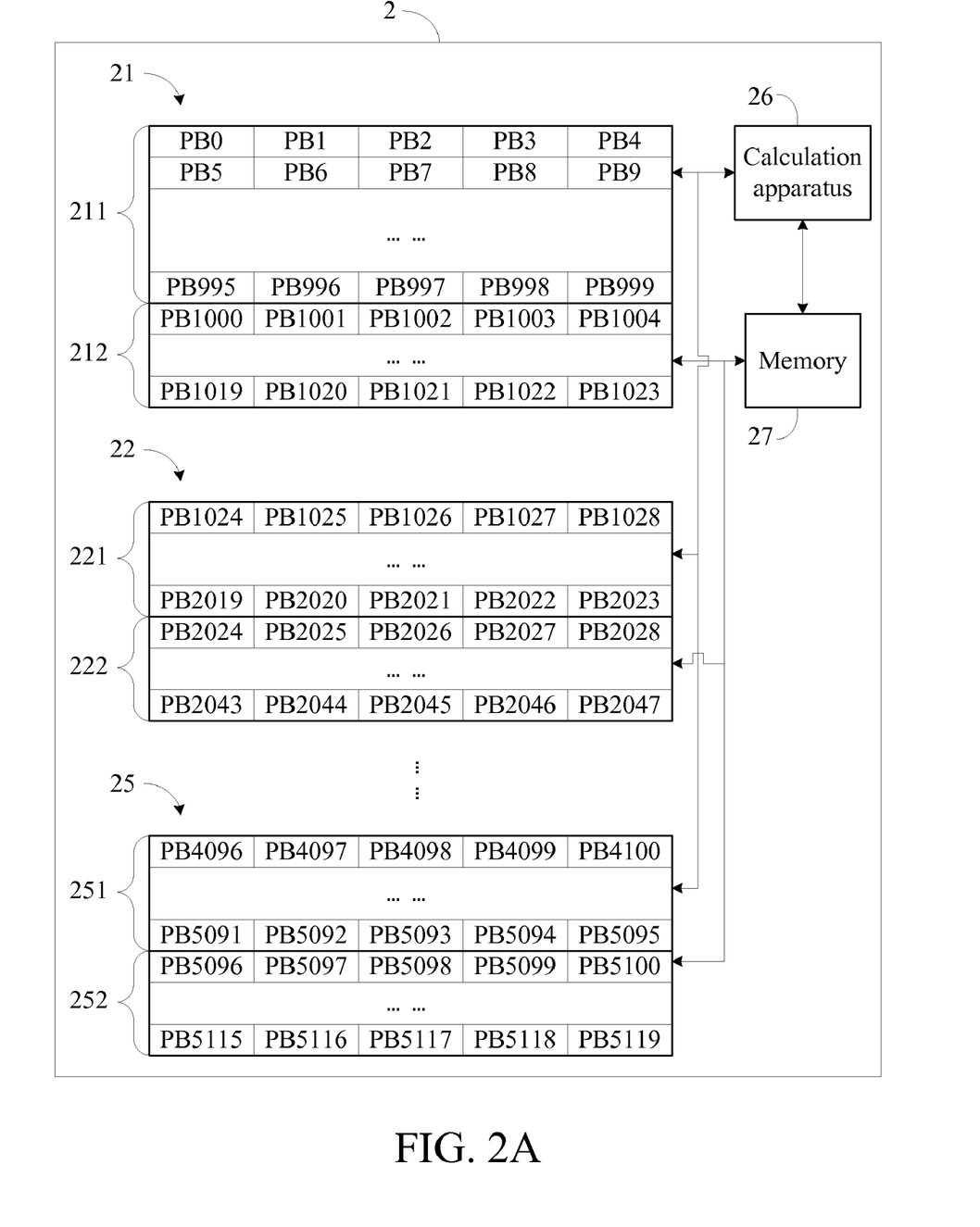
FIG. 2A illustrates a storage apparatus of a second embodiment.

FIG. 2A illustrates a second embodiment of the present invention, which is also a storage apparatus 2. The storage apparatus 2 comprises a plurality of blocks PB0~PB5119, a calculation apparatus 26, and a memory 27. The apparatus 2 comprises five management units and each of the management units comprises a data area and an spare area. Each of the data area comprises a plurality of data blocks, which are part of the aforementioned blocks. Each of the spare area comprises a plurality of spare blocks, which are also part of the aforementioned blocks.

Specifically, the data area 211 of the first management unit 21 comprises data blocks PB0~PB999, while the spare area 212 of the first management unit 21 comprises spare blocks PB1000~PB1023. The data area 221 of the second management unit 22 comprises data blocks PB1024~PB2023, while the spare area 222 of the second management unit 22 comprises spare blocks PB2024~PB2047. The data area of the third management unit comprises data blocks PB2048~PB3047, while the spare area of the third management unit comprises spare blocks PB3048~PB3071. The data area of the fourth management unit comprises data blocks PB3072~PB4071, while the spare area of the fourth management unit comprises spare blocks PB4072~PB4095. The data area 251 of the fifth management unit 25 comprises data blocks PB4096~PB5095, while the spare area 252 of the fifth management unit 25 comprises spare blocks PB5096~PB5119.

The memory 27 stores a plurality of logical pointers LB0~LB4999 and a plurality of backup pointers BB0~BB119. Initially, the logical pointers LB0~LB4999 correspond to the data blocks PB0~PB999, PB1024~PB2023, PB2048~PB3047, PB3072~PB4071, and PB4096~PB5095. More particularly, the logical pointers sequentially and cyclically correspond to the management units. For example, logical pointer LB0 corresponds to data block PB0 of the first management unit 21, logical pointer LB1 corresponds to the data block PB1024 of the second management unit 22, the logical pointer LB2 corresponds to data block PB2048 of the third management unit, logical pointer LB3 corresponds to data block PB3072 of the fourth management unit, logical pointer LB4 corresponds to data block PB4096 of the fifth management, logical pointer LB5 corresponds to data block PB1 of the first management unit, etc. The backup pointers BB0~BB119 correspond to the spare blocks PB1000~PB1023, PB2024~PB2047, PB3048~PB3071, PB4072~PB4095, and PB5096~PB5119 respectively. More particularly, backup pointer BB0 corresponds to spare block PB1000 of the first management unit 21, backup pointer BB1 corresponds to spare block PB2024 of the second management unit 22, backup pointer BB2 corresponds to spare block PB3048 of the third management unit, backup pointer BB3 corresponds to spare block PB4072 of the fourth management unit, backup pointer BB4 corresponds to spare block PB5096 of the fifth management unit, backup pointer BB5 corresponds to spare block PB1001 of the first management unit 21 again, and etc. In the second embodiment, the backup pointers BB0~BB119 has a first sequence, which is represented by the number of the backup pointers ordered from the smallest to the largest. This means that the first sequence determines the order of the management units. The logical pointers LB0~LB4999 has a second sequence, which is represented by the number of the backup pointers, ordered from the smallest to the largest as well. This means that the second sequence also determines the order of the management units.

Figure 2B:
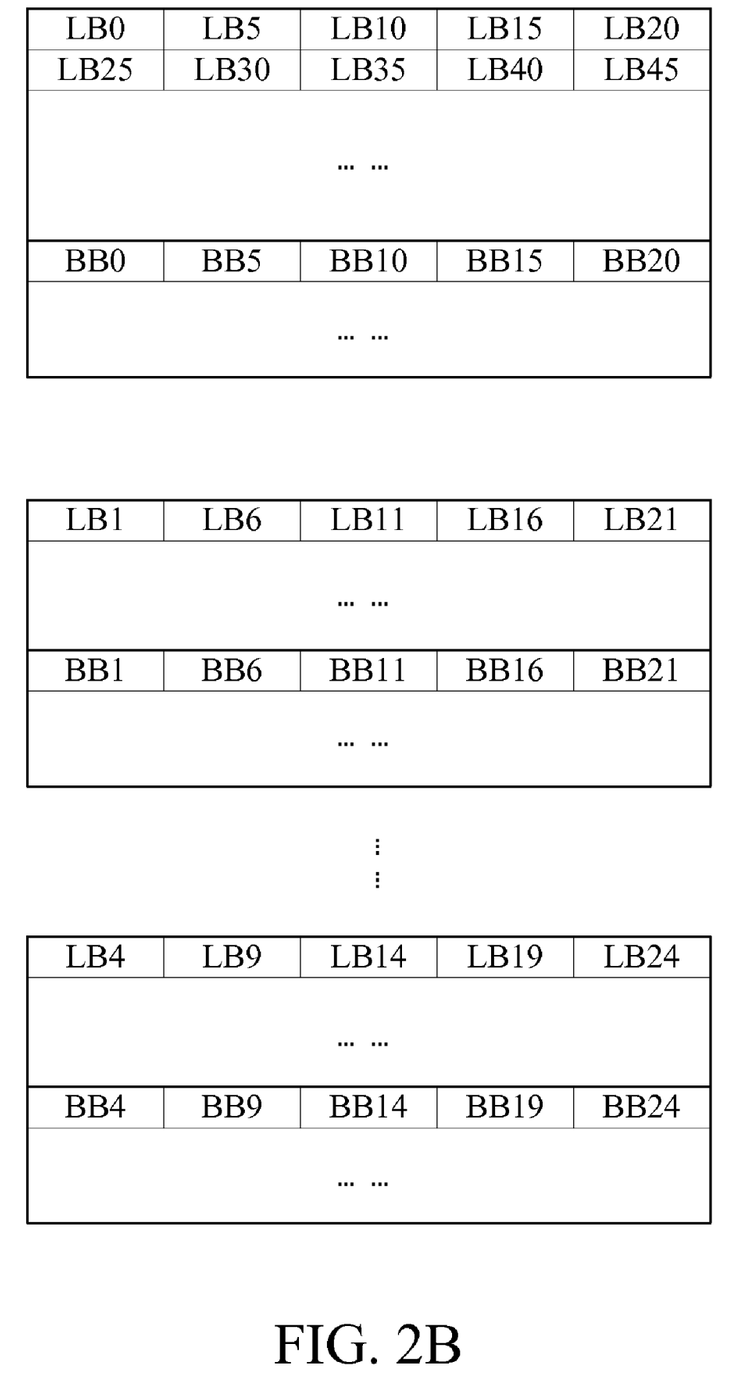
FIG. 2B illustrates the initial relationships between the logical pointers and the data blocks and between the backup pointers and the spare blocks of the second embodiment.

FIG. 2B illustrates the initial relationships between the logical pointers LB0~LB4999 and the data blocks PB0~PB999, PB1024~PB2023, PB2048~PB3047, PB3072~PB4071, and PB4096~PB5095 and the initial relationships between the backup pointers BB0~BB119 and the spare blocks PB1000~PB1023, PB2024~PB2047, PB3048~PB3071, PB4072~PB4095, and PB5096~PB5119. Please refer to FIG. 2A for better understanding.

Figure 2C:
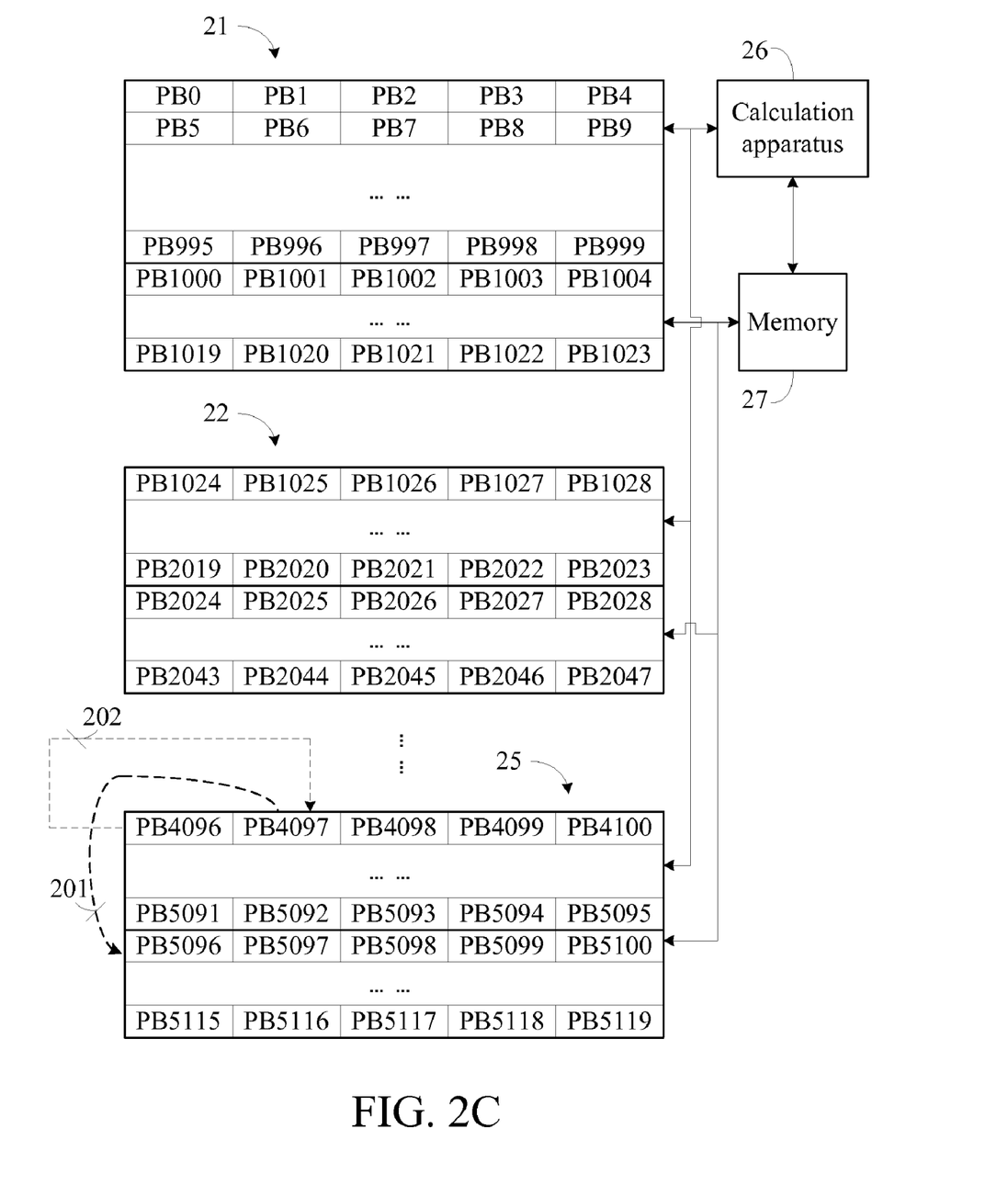
FIG. 2C illustrates another concept of data moving.

The memory management method is explained with the assistance of the following example and FIG. 2C. Assume that the user intends to update the data block that corresponds to the logical pointer LB4 of the storage apparatus 2. At this time, the calculation apparatus 26 confirms that the logical pointer LB4 corresponds to the data block PB4096, which means that the data block PB4096 is denoted as the first written block PB4096 and requires an update. Next, the calculation apparatus 26 selects one of the spare blocks from the same management unit that the data block PB4096 belongs to as a first moving block according to the first sequence of the backup pointers. The calculation apparatus 26 selects one of the data blocks, besides the first written block PB4096, from the same management unit that the data block PB4096 belongs to as a second moving block according to the second sequence of the logical pointers. Specifically, in the second embodiment, the calculation apparatus 26 selects the spare block 5096 that corresponds to the backup pointer BB4 as the first moving block 5096. Similarly, the second sequence is ordered from the logical pointer LB0 to LB4999. Thus, the calculation apparatus 26 selects the data block PB4097 that corresponds to the logical pointer LB9 as the second moving block PB4097.

Figure 2D:
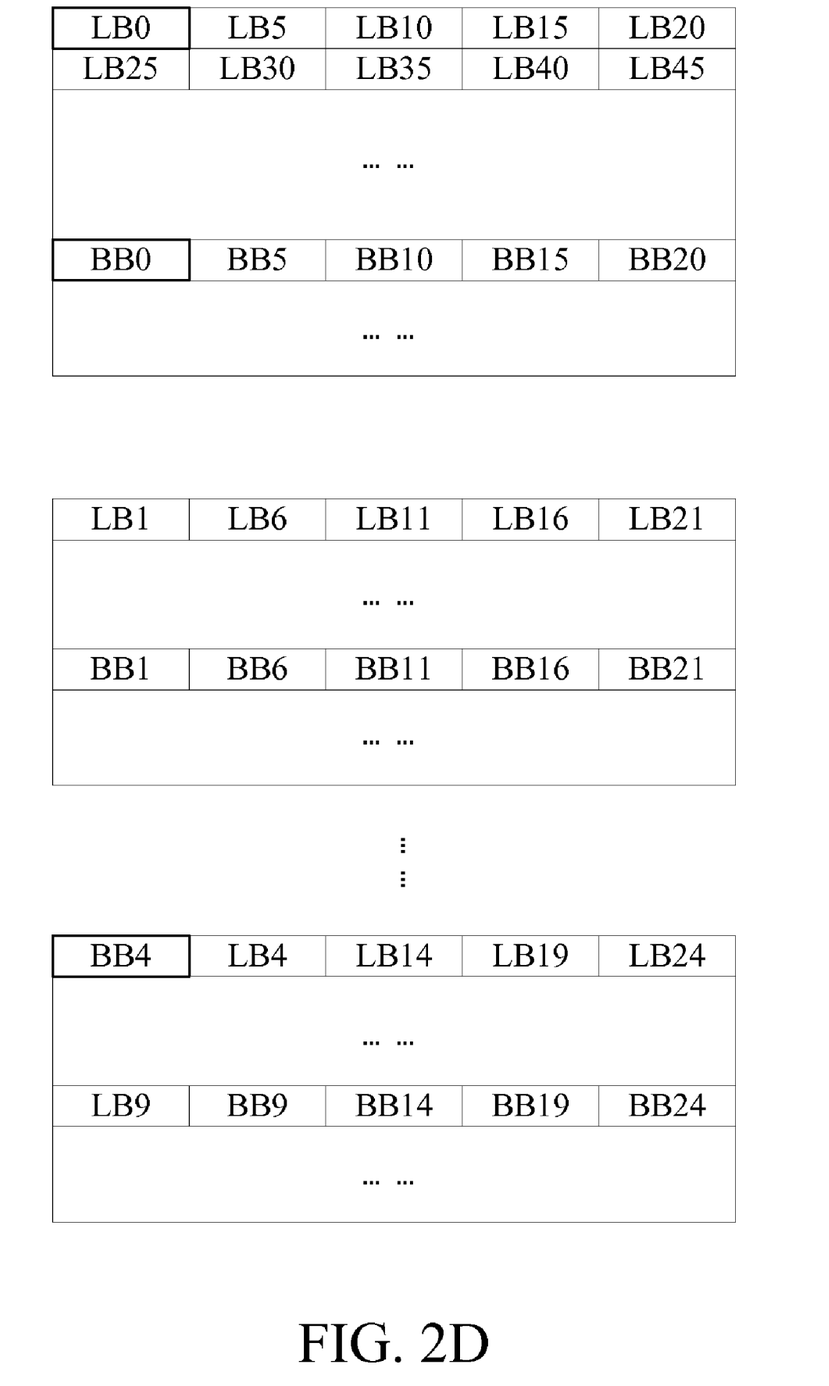
FIG. 2D illustrates the relationships between the pointers and the blocks after the LB4 has been processed.

At this time, the calculation apparatus 26 erases a content of the first moving block PB5096 and then writes a first data originally stored in the second moving block PB4097 into the first moving block PB5096. The concept of moving the first data is indicated by the arrow 201 in FIG. 2C. Logical pointer LB9, originally corresponding to PB4097, has to be changed to correspond to PB5096 to ensure that the data pointed by LB9 has been stored in PB5906. By doing so, the accuracy of data access is ensured. This also shows that the backup pointer corresponds to a different spare block after every access. After that, PB4097 becomes an available data block that can be used. The calculation apparatus 26 erases a content of the second moving block PB4097 and then writes a second data originally stored in the first written block PB4096 into the second moving block PB4097. The movement of the data is indicated by the arrow 202 in FIG. 2C. Logical pointer LB4, originally corresponding to PB4096, has to be changed to correspond to PB4097 so that data access remain accurate. Then, the backup pointer BB4 has to be changed to correspond to PB4096. Now, the update of the first written block PB4096 has been completed. After the update, the relationships between the pointers and the blocks are illustrated in FIG. 2D and FIG. 2C.

A third embodiment of the present invention is a storage apparatus 3 as illustrated in FIG. 3. The storage apparatus 3 comprises a plurality of blocks PB0~PB5119, a calculation apparatus 36, and a memory 37. The storage apparatus 3 also comprises five management units. (FIG. 3 illustrates only three management units 31, 32, 35 for clearly understanding). Each of the management units comprises a data area and an spare area. Each of the data area comprises a plurality of data blocks, which are part of the aforementioned blocks. In addition, each of the spare area comprises a plurality of spare blocks, which are another part of the aforementioned blocks.

Figure 3A:
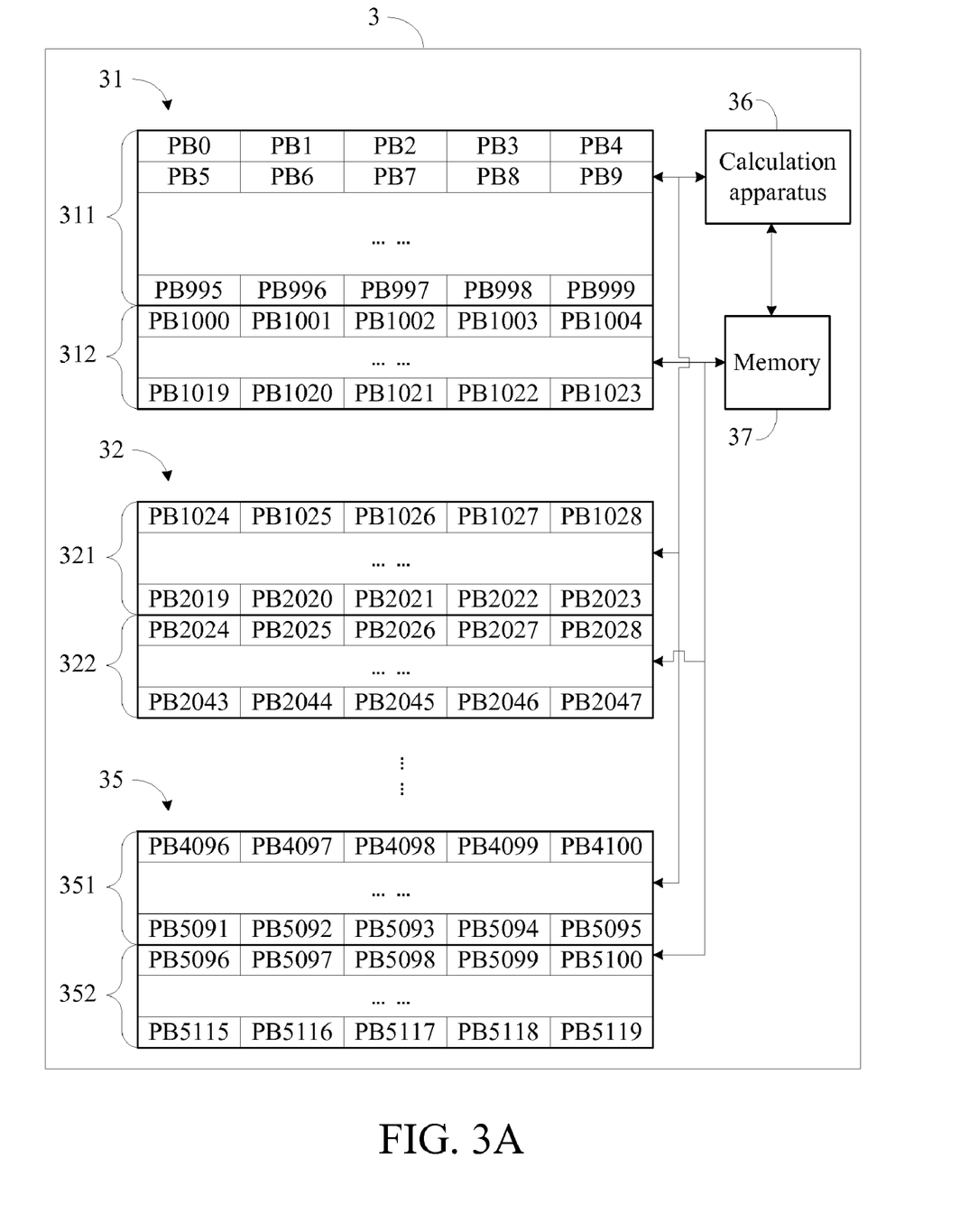
FIG. 3A illustrates a storage apparatus of a third embodiment.

The data area 311 of the first management unit 31 comprises data blocks PB0~PB999, while the spare area 312 of the first management unit 31 comprises spare blocks PB1000~PB1023. The data area 321 of the second management unit 32 comprises data blocks PB1024~PB2023, while the spare area 322 of the second management unit 32 comprises spare blocks PB2024~PB2047. The data area of the third management unit comprises data blocks PB2048~PB3047, while the spare area of the third management unit comprises spare blocks PB3048~PB3071. The data area of the fourth management unit comprises data blocks PB3072~PB4071, while the spare area of the fourth management unit comprises spare blocks PB4072~PB4095. The data area 351 of the fifth management unit 35 comprises data blocks PB4096~PB5095, while the spare area 352 of the fifth management unit 35 comprises spare blocks PB5096~PB5119.

Figure 3B:
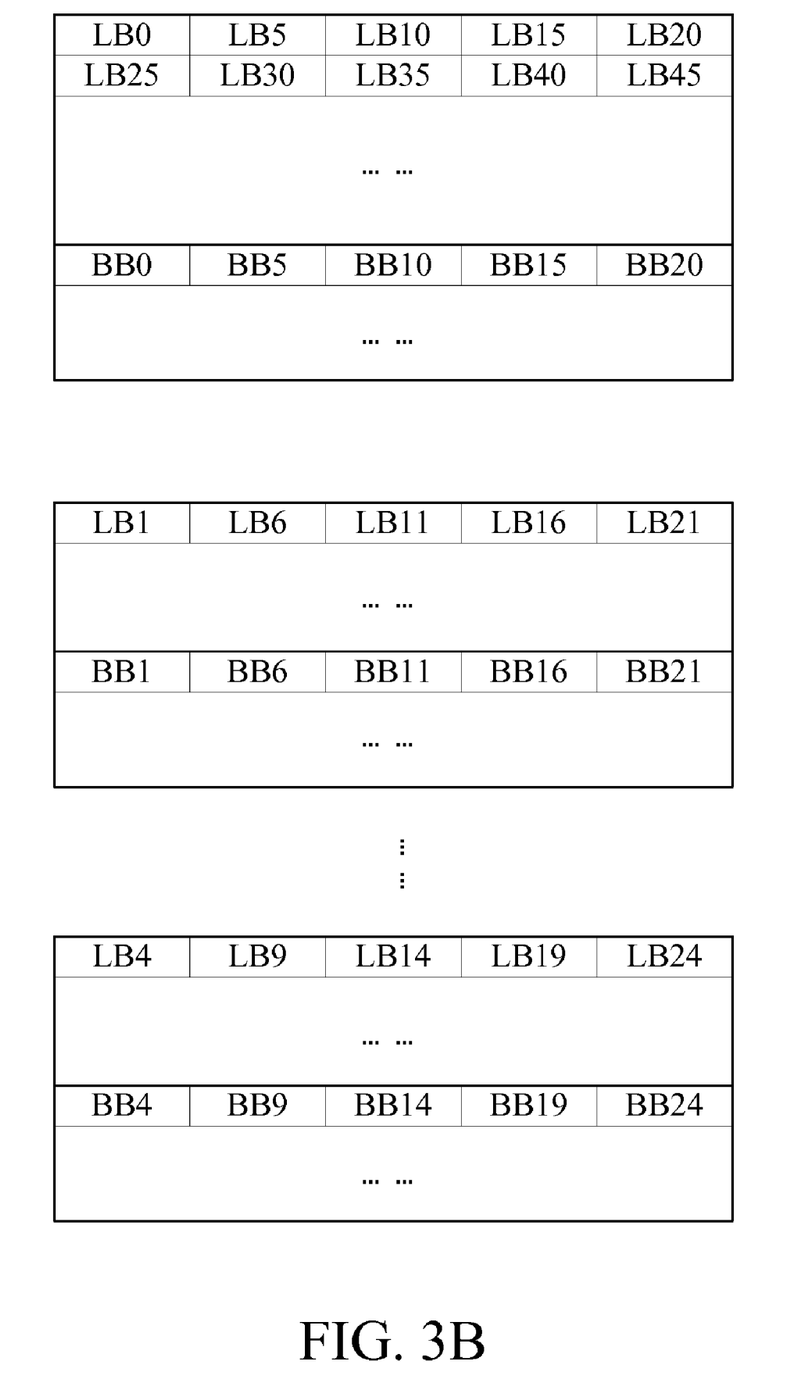
FIG. 3B illustrates the initial relationships between the logical pointers and the data blocks and between the backup pointers and the spare blocks of the third embodiment.

The memory 37 stores a plurality of logical pointers LB0~LB4999 and a plurality of backup pointers BB0~BB119. Initially, the relationships between the logical pointers and the data blocks and between the backup pointers and the spare blocks are illustrated in FIG. 3B. The apparatus 3 of the third embodiment is similar to the apparatus 2 of the second embodiment. The difference is that the apparatus 3 of the third embodiment can use spare blocks in other management units.

Figure 3C:
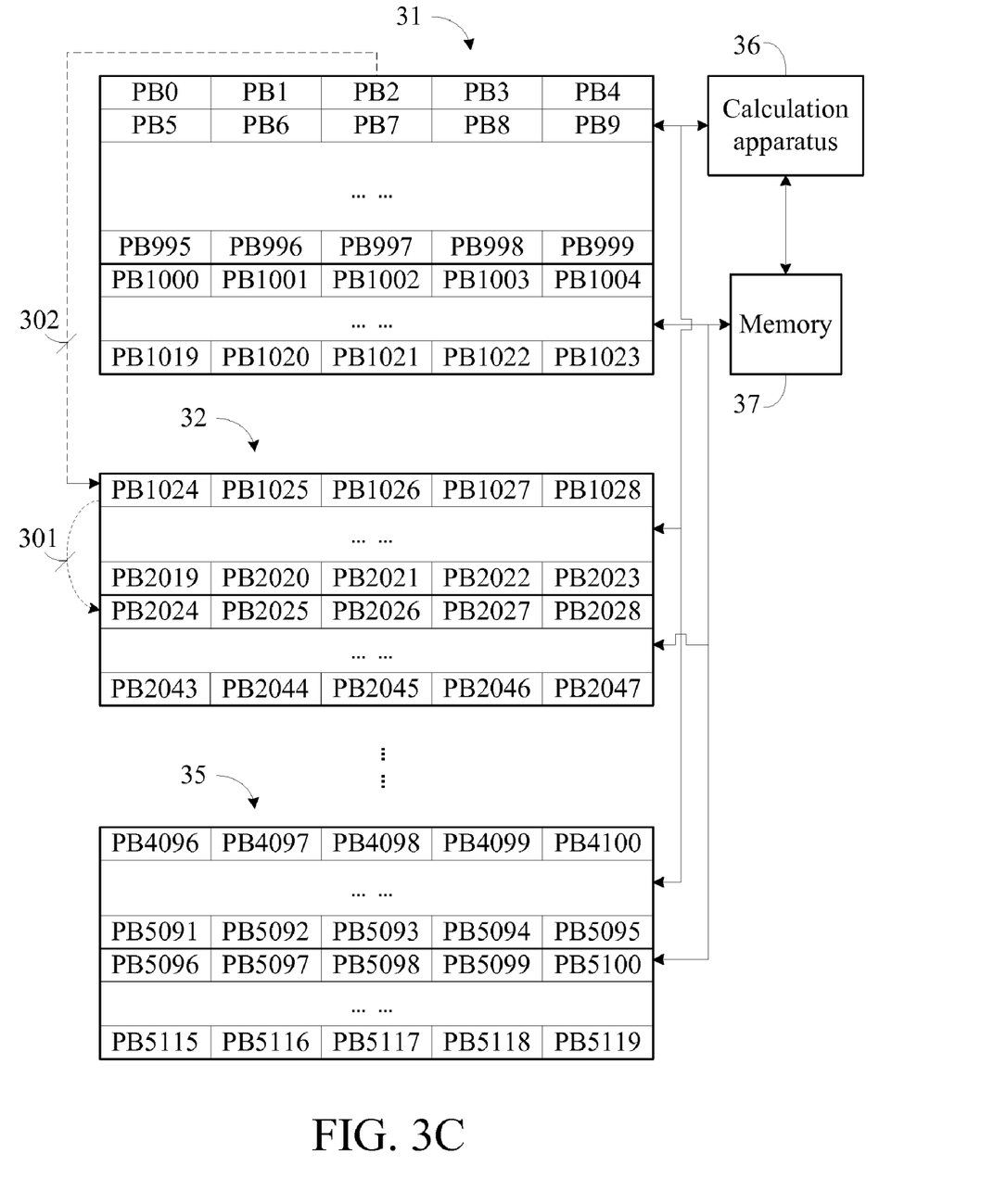
FIG. 3C illustrates yet another concept of data moving.
Figure 3D:
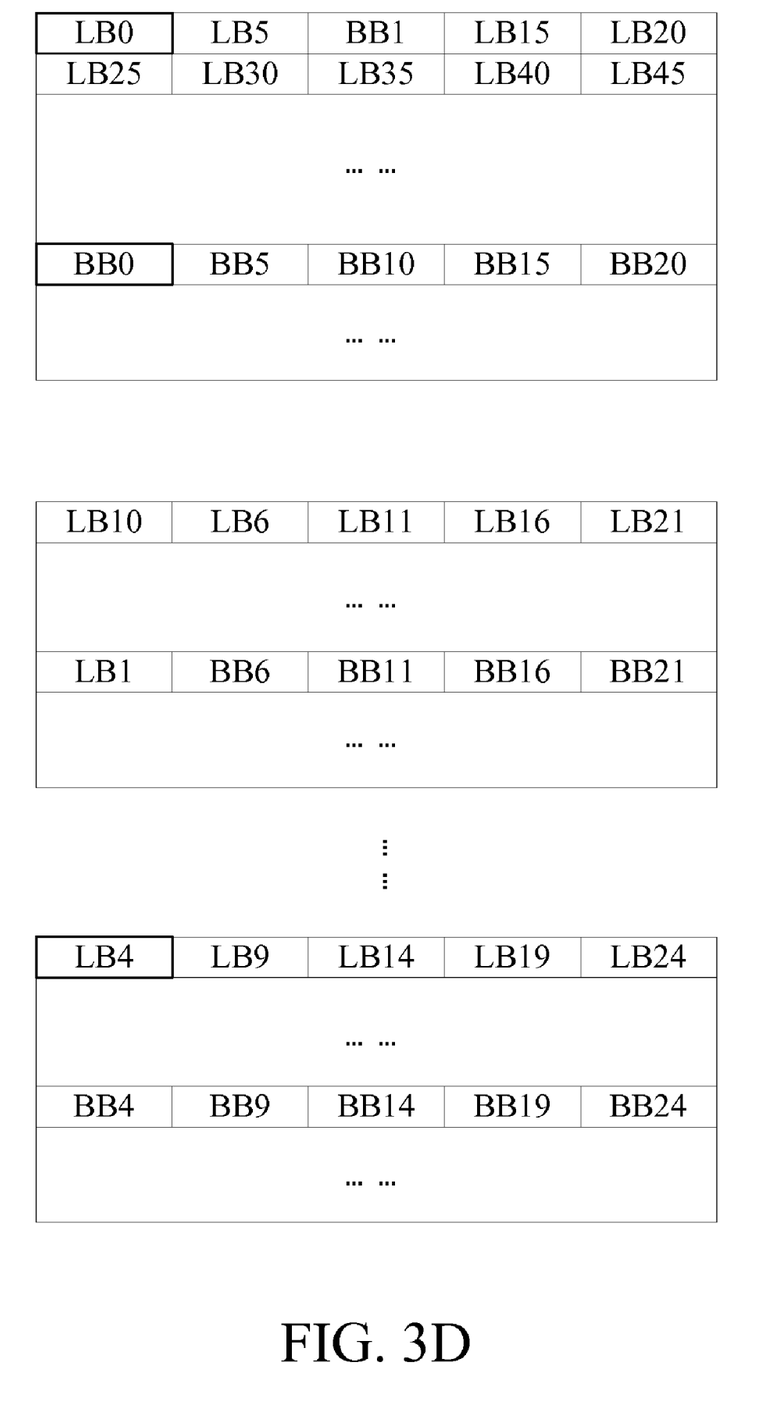
FIG. 3D illustrates the relationships between the pointers and the blocks after the LB10 has been processed.

The memory management method is explained with the assistance of the following example and FIG. 3C. It is assumed that a user intends to write data into the data block corresponding to logical pointer LB10, wherein data block PB2 is the data block that corresponds to logical pointer LB10. It is also assumed that the first management unit 31 that data block PB2 belongs to does not have an available spare block. To achieve data access, the first management unit 31 can use the available spare blocks of other management units, such as the second management unit 32. During this time, the calculation apparatus 36 confirms that logical pointer LB10 corresponds to data block PB2. Data block PB2 then represents a first written block PB2, meaning that it requires an update. Next, the calculation apparatus 36 selects the spare block PB2024 corresponding to the backup pointer BB1 as a first moving block PB2024 according to a first sequence. In addition, the calculation apparatus 36 selects data block PB1024, which corresponds to logical pointer LB1, as the second moving block PB1024 according to the second relationship. The calculation apparatus 36 marks spare block PB2024 to indicate that it comes from the second management unit.

Based on the arrangement, the first written block PB2, the second moving block PB2024, and the third moving block PB1024 do not have to be of the same management unit. The calculation apparatus 36 performs the following operations: erasing a content of the first moving block PB2024; writing the data of the second moving block PB1024 into the first moving block PB2024 as shown by the arrow 301; making LB1 correspond to the second moving block PB2024; erasing a content of the second moving block PB1024; writing the data that the user intends to write into the second moving block PB1024 as shown by the arrow 302; corresponding logical pointer LB10 to the second moving block PB1024; and corresponding backup pointer BB1 to PB2. The data has now been written in.

Figure 4:
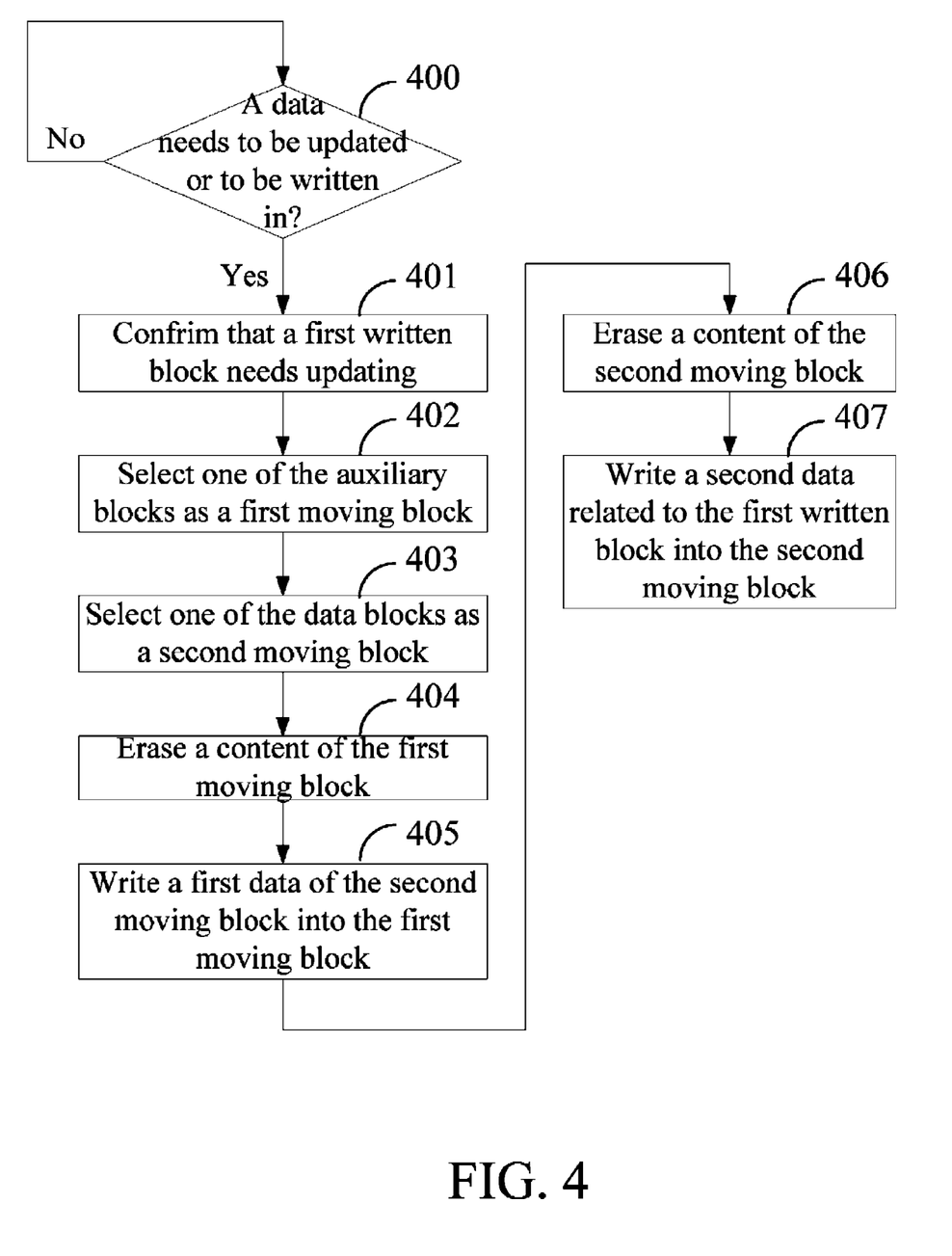
FIG. 4 illustrates the flowchart of a fourth embodiment.

According to the aforementioned descriptions, the data blocks and spare blocks are grouped into different management units. Based on the order of the logical pointers and the order of the backup pointers, data blocks and spare blocks of different management units can be used in rotation so that the storage apparatus can be uniformly used. Meanwhile, if a management unit cannot use its spare blocks due to errors or damages, spare blocks from other management units can be used instead. The management unit uses additional bits to indicate that the spare blocks are from other management units. That is, when spare blocks of a management unit cannot be used, data access can be achieved by using spare blocks of other management units. Consequently, there would never be a situation in which no management units could be accessed due to the failure of a single spare block. The fourth embodiment of the present invention is a method for accessing a storage apparatus, whose flowchart is illustrated in FIG. 4. The storage apparatus comprises a plurality of data blocks and a plurality of spare blocks. The storage apparatus further comprises a plurality of management units. The data blocks are grouped into a plurality of data areas, while the spare are grouped into a plurality of spare areas. Each of the management units comprises one of the data areas and one of the spare areas. In addition, each of the data blocks corresponds to a logical pointer, while each of the spare blocks corresponds to a backup pointer. The backup pointers have a first sequence, while the logical pointers have a second sequence.

First, step 400 determines whether a data needs to be updated or written in. If not, step 400 is repeated after a period of time. If so, step 401 is executed to confirm that a first written block needs update. Next, step 402 is executed to select one of the spare blocks as a first moving block according to the first sequence. The method then executes step 403 to select one of the data blocks as a second moving block according to the second sequence, wherein the second moving block is not the first written block. Step 404 is then executed to erase a content of the first moving block so that step 405 can be executed to write a first data of the second moving block into the first moving block. In step 406, a content of the second moving block is erased so that in step 407, a second data related to the first written block can be written into the second moving block. The above steps can be repeated to determine whether other data needs to be updated or written in.

It is noted that the first written block, the first moving block, and the second moving block can be set to be in the same management unit. In other situations, they may be in different management units. By sorting the logical pointers and the backup pointers, data blocks and spare blocks in different management units can be used in rotation. Thus, the storage apparatus can be used more uniformly.

In addition to the aforementioned steps, the fourth embodiment is able to execute all of the operations and the functions recited in the first embodiment, the second embodiment, and the third embodiment. Those skilled in this field should be able to straightforwardly realize how the fourth embodiment performs these operations and functions based on the above descriptions of the first embodiment, the second embodiment, and the third embodiment. Thus, no unnecessary detail is given here.

The above disclosure is related to the detailed technical contents and inventive features thereof. People skilled in the art may proceed with a variety of modifications and replacements based on the disclosures and suggestions of the invention as described without departing from the characteristics thereof. For instance, it is also applicable that the user can key in an input password to the personal computer first, after the first encryption unit receives the duplicate key, the encryption algorithm is used to encrypt the input password to derive the encrypted text. Nevertheless, although such modifications and replacements are not fully disclosed in the above descriptions, they have substantially been covered in the following claims as appended.

What is claimed is:

1. A storage apparatus, comprising:
   a plurality of data blocks;
   a plurality of spare blocks; and
   a calculation apparatus being configured for confirming that a first written block needs update, for selecting one of the spare blocks as a first moving block, for selecting one of the data blocks as a second moving block, for writing a first data of the second moving block into the first moving block, and for writing a second data related to the first written block into the second moving block;
   wherein the second moving block is not the first written block.

2. The storage apparatus of claim 1, wherein the calculation apparatus is further configured for erasing a content of the first moving block before writing the first moving block and for erasing a content of the second moving block before writing the second moving block.

3. The storage apparatus of claim 1, wherein the calculation apparatus performs the confirmation in response to a host requesting to update the first written block or the second data is new data received from a host.

4. The storage apparatus of claim 1, further comprising
   a memory being configured for storing a plurality of logical pointers and a plurality of backup pointers, each of the data blocks corresponding to one of the logical pointers, each of the spare blocks corresponding to one of the backup pointers, the backup pointers having a first sequence, and the logical pointers having a second sequence;
   wherein the calculation apparatus selects the first moving block according to the first sequence and selects the second moving block according to the second sequence.

5. The storage apparatus of claim 4, the data blocks being grouped into a plurality of data areas, the spare being grouped into a plurality of spare areas, the storage apparatus further comprising:
   a plurality of management units, each of the management units comprising one of the data areas and one of the spare areas;
   wherein the first sequence is configured for sorting the management units and the second sequence is configured for sorting the management units.

6. The storage apparatus of claim 4, wherein the calculation apparatus is further configured for confirming that a second written block needs update, selecting one of the spare blocks as a third moving block according to the first sequence, selecting one of the data blocks as a fourth moving block according to the second sequence, writing a third data of the fourth moving block into the third moving block, and writing a fourth data related to the second written block into the fourth moving block.

7. The storage apparatus of claim 6, wherein the calculation apparatus is further configured for erasing a content of the third moving block before writing the third moving block and erasing a content of the fourth moving block before writing the fourth moving block.

8. The storage apparatus of claim 6, wherein the confirming step is performed in response to a host requesting to update the second written block or the fourth data is new data received from a host.

9. The storage apparatus of claim 6, the data blocks being grouped into a plurality of data areas, the spare being grouped into a plurality of spare areas, the storage apparatus further comprising:
   a plurality of management units, each of the management units comprising one of the data areas and one of the spare areas;
   wherein the first written block, the first moving block, the second moving block, the second written block, the third moving block, and the fourth moving block belong to at least two different management units.

10. A method for accessing a storage apparatus, the storage apparatus comprising a plurality of data blocks and a plurality of spare blocks, the method comprising the steps of:
    confirming that a first written block needs update;
    selecting one of the spare blocks as a first moving block;
    selecting one of the data blocks as a second moving block, the second moving block being not the first written block;
    writing a first data of the second moving block into the first moving block; and
    writing a second data related to the first written block into the second moving block.

11. The method of claim 10, further comprising the steps of:
    erasing a content of the first moving block; and
    erasing a content of the second moving block.

12. The method of claim 10, wherein the confirming step is performed in response to a host requesting to update the first written block or the second data is new data received from a host.

13. The method of claim 10, wherein each of the data blocks corresponds to a logical pointer, each of the spare blocks corresponds to a backup pointer, the backup pointers have a first sequence, the logical pointers have a second sequence, the step of selecting the spare blocks is executed according to the first sequence, and the step of selecting the data blocks is executed according to the second sequence.

14. The method of claim 13, wherein the storage apparatus further comprises a plurality of management units, the data blocks are grouped into a plurality of data areas, the spare block are grouped into a plurality of spare areas, each of the management units comprises one of the data areas and one of the spare areas, the first sequence is configured for sorting the management units, and the second sequence is configured for sorting the management units.

15. The method of claim 13, further comprising the steps of:
   confirming that a second written block needs update;
   selecting one of the spare blocks as a third moving block according to the first sequence;
   selecting one of the data blocks as a fourth moving block according to the second sequence;
   writing a third data of the fourth moving block into the third moving block; and
   writing a fourth data related to the second written block into the fourth moving block.

16. The method of claim 15, further comprising the steps of:
   erasing a content of the third moving block; and
   erasing a content of the fourth moving block.

17. The method of claim 15, wherein the confirming step is performed in response to a host requesting to update the second written block or the fourth data is new data received from a host.

18. The method of claim 15, wherein the storage apparatus further comprises a plurality of management units, the data blocks are grouped into a plurality of data areas, the spare are grouped into a plurality of spare areas, each of the management units comprises one of the data areas and one of the spare areas, and the first written block, the first moving block, the second moving block, the second written block, the third moving block, and the fourth moving block belong to at least two different management units.

* * * * *